United States Patent
Wang et al.

(10) Patent No.: US 7,815,346 B2
(45) Date of Patent: Oct. 19, 2010

(54) METHOD FOR CALCULATING OUT AN OPTIMUM ARRANGEMENT PITCH BETWEEN EACH TWO LED CHIP PACKAGE UNITS

(75) Inventors: Bily Wang, Hsinchu (TW); Shih-Yu Wu, Banciao (TW); Wen-Kuei Wu, Hukou Township, Hsinchu County (TW)

(73) Assignee: Harvatek Corporation, Hsinchu (TW)

( * ) Notice: Subject to any disclaimer, the term of this patent is extended or adjusted under 35 U.S.C. 154(b) by 95 days.

(21) Appl. No.: 12/285,178

(22) Filed: Sep. 30, 2008

(65) Prior Publication Data

US 2009/0213378 A1    Aug. 27, 2009

(30) Foreign Application Priority Data

Feb. 27, 2008    (TW) ............................. 97106768 A

(51) Int. Cl.
*F21V 5/00* (2006.01)
*G09G 5/00* (2006.01)

(52) U.S. Cl. ...................... 362/337; 362/626; 359/832; 345/205

(58) Field of Classification Search ................ 362/337, 362/339, 626, 257, 607, 561, 26; 349/64, 349/65, 58; 345/88; 359/832; 435/205
See application file for complete search history.

(56) References Cited

U.S. PATENT DOCUMENTS

| | | | | |
|---|---|---|---|---|
| 7,354,179 B2 * | 4/2008 | Huang et al. | ................ | 362/337 |
| 7,460,196 B2 * | 12/2008 | Kim et al. | ..................... | 349/64 |
| 2005/0057913 A1 * | 3/2005 | Dennis | ........................ | 362/26 |
| 2005/0088587 A1 * | 4/2005 | Pan et al. | ...................... | 349/65 |
| 2006/0262569 A1 * | 11/2006 | Kim et al. | .................... | 362/626 |
| 2009/0128471 A1 * | 5/2009 | Hsiao et al. | ................... | 345/88 |

* cited by examiner

*Primary Examiner*—Sang Nguyen
(74) *Attorney, Agent, or Firm*—Rosenberg, Klein & Lee

(57) ABSTRACT

A method for calculating out an optimum arrangement pitch between each two LED chip package units, including: providing a backlight module with a predetermined brightness value and a predetermined material information that a customer needs; determining what brightness level and amount of LED chip package units need to be used by a designer according to the brightness value and the material information of the backlight module; and dividedly arranging the LED chip package units determined by the designer on a light-entering area of the backlight module in order to define what the optimum arrangement pitch between each two LED chip package units is.

7 Claims, 3 Drawing Sheets

METHOD FOR CALCULATING OUT AN OPTIMUM ARRANGEMENT PITCH BETWEEN EACH TWO LED CHIP PACKAGE UNITS

BACKGROUND OF THE INVENTION

1. Field of the Invention

The present invention relates to a method for arranging LED chip package units, and particularly relates to a method for calculating out an optimum arrangement pitch between each two LED chip package units.

2. Description of Related Art

In general, designers arrange LED chip package units of the prior art on a substrate according to their own experience. In other words, the designer defines the distance between each two LED chip package units in a backlight unit according to previous experience. However, the method of the prior art cannot determine the most suitable distances and also can easily produce man-made errors.

SUMMARY OF THE INVENTION

One particular aspect of the present invention is to provide a method for calculating out an optimum arrangement pitch between each two LED chip package units. The present invention can determine what brightness level and amount of LED chip package units need to be used by a designer according to the brightness value and the material information of the backlight module in order to define the optimum arrangement pitch between each two LED chip package units.

In order to achieve the above-mentioned aspects, the present invention provides a method for calculating out an optimum arrangement pitch between each two LED chip package units, including: providing a backlight module with a predetermined brightness value and a predetermined material information that a customer needs; determining what brightness level and amount of LED chip package units need to be used by a designer according to the brightness value and the material information of the backlight module; and dividedly arranging the LED chip package units determined by the designer on a light-entering area of the backlight module in order to define what the optimum arrangement pitch between each two LED chip package units is.

Hence, the present invention can accurately calculate out the optimum arrangement pitch between each two LED chip package units.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
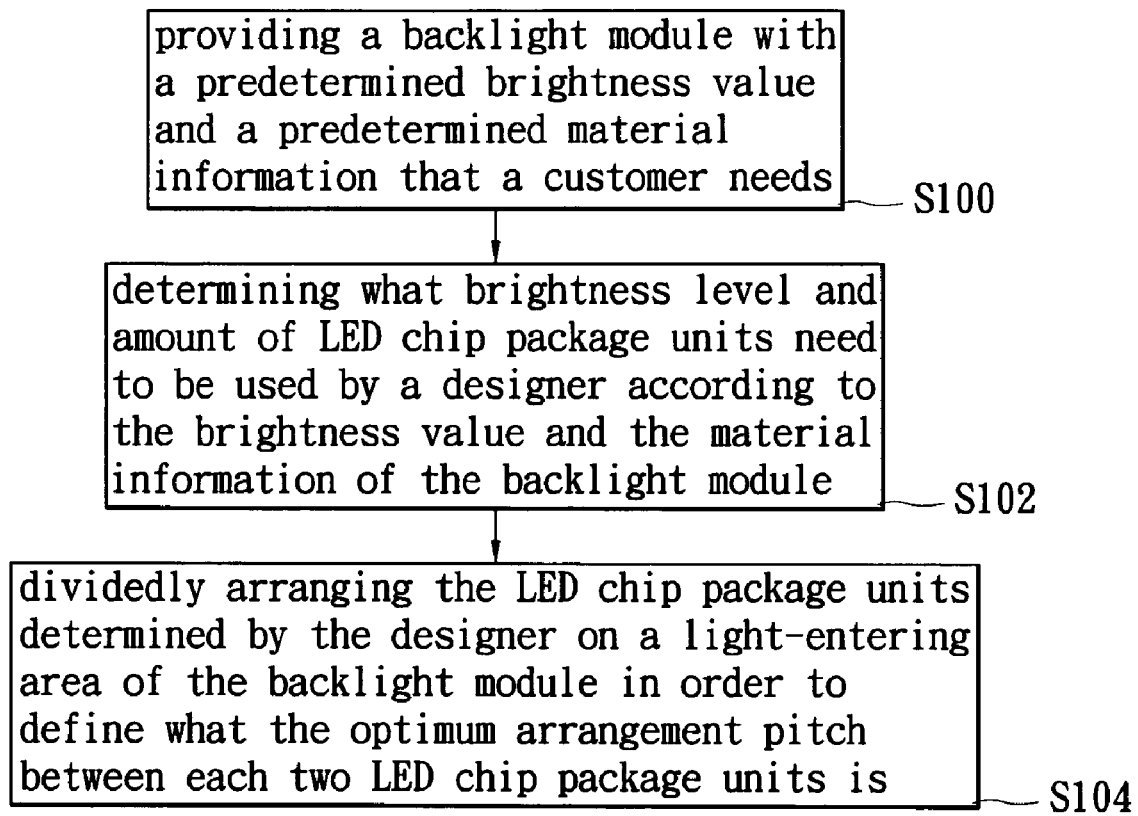
FIG. 1 is a flowchart of a method for calculating out an optimum arrangement pitch between each two LED chip package units of the present invention.

Referring to FIG. 1, the present invention provides a method for calculating out an optimum arrangement pitch between each two LED chip package units, including: providing a backlight module with a predetermined brightness value and a predetermined material information that a customer needs (S100); determining what brightness level and amount of LED chip package units need to be used by a designer according to the brightness value and the material information of the backlight module (S102); and dividedly arranging the LED chip package units determined by the designer on a light-entering area of the backlight module in order to define what the optimum arrangement pitch between each two LED chip package units is (S104).

Figure 2:
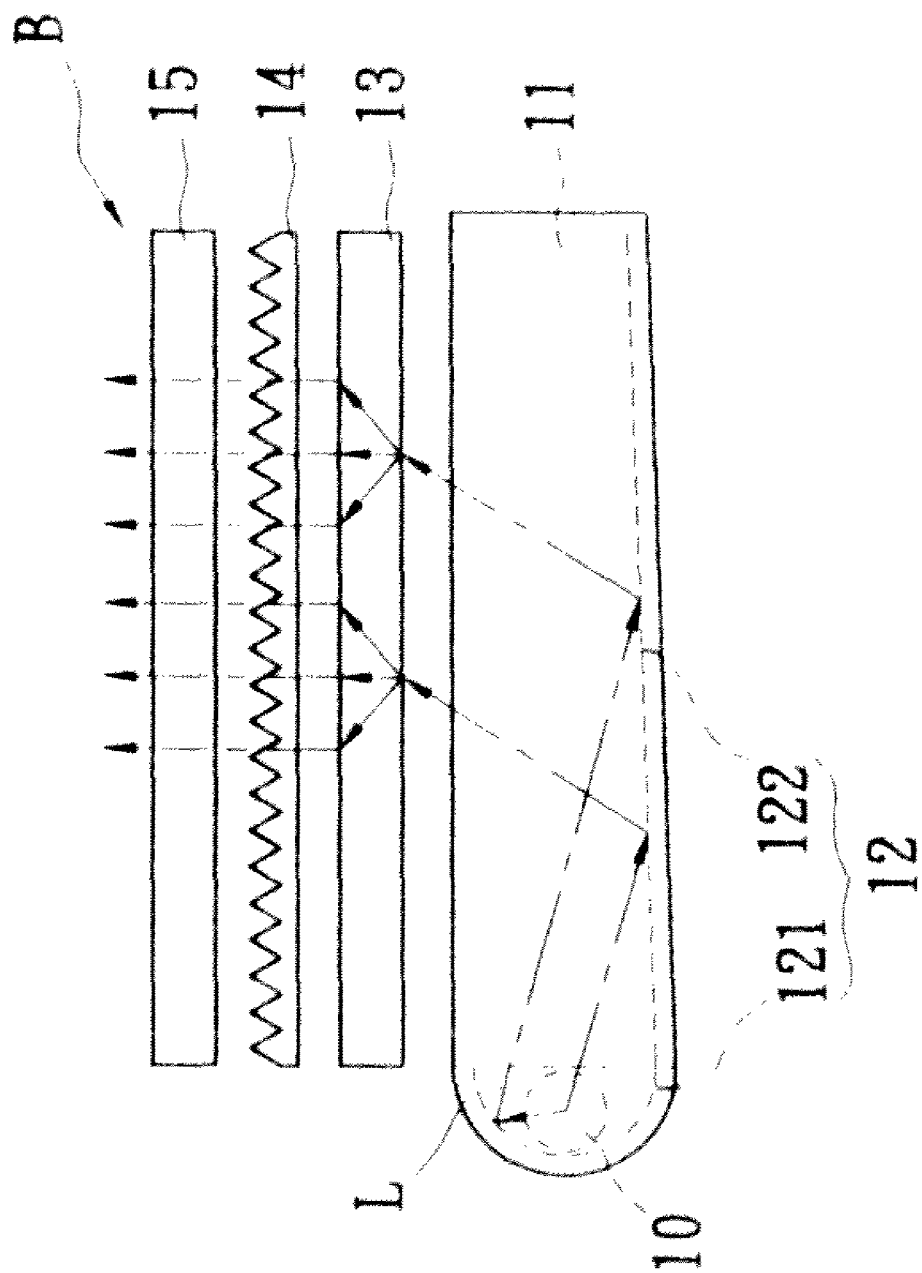
FIG. 2 is a side, schematic view of a backlight module of the present invention.
Figure 3A:
FIG. 3A is a schematic view of the first type of arrangement of LED chip package units.
Figure 3B:
FIG. 3B is a schematic view of the second type of arrangement of LED chip package units.

Referring to FIGS. 2, 3A and 3B, the backlight module B is composed of a light emitting unit 10, a light guiding board 11, a reflective board 12, a diffusing board 13, a prism board 14, and an LED light polarizing board 15. In addition, the light emitting unit 10 is composed of the LED chip package units 100 determined by the designer, and light beams L generated from the light emitting unit 10 are directly projected onto the light guiding board 11 or are indirectly projected onto the light guiding board 11 via the reflective board 12.

Moreover, the reflective board 12 has a first reflective board portion 121 and a second reflective board portion 122. The light beams L generated from the light emitting unit 10 are reflected by the first reflective board portion 121, and the light beams L that have passed the light guiding board 11 are reflected by the second reflective board portion 122. In addition, the light guiding board 11 is disposed beside one side of the light emitting unit 10 for receiving the light beams L generated from the light emitting unit 10, the diffusing board 13 is disposed over the light guiding board 11, the prism board 14 is disposed over the diffusing board 13, and the LED light polarizing board 15 is disposed over the prism board 14.

Therefore, referring to FIG. 3A, the present invention provides a method for calculating out an optimum arrangement pitch between each two LED chip package units, including: firstly, providing a backlight module with a predetermined brightness value (5500 nits) and a predetermined material information such as the backlight module B of FIG. 2 that a customer needs; determining to use 27 LED chip package units 100 with 1200 mcd by a designer according to the brightness value and the material information of the backlight module B; and dividedly arranging the 27 LED chip package units 100 with 1200 mcd determined by the designer on a light-entering area of the backlight module B in order to define the optimum arrangement pitch (5.5 mm) between each two LED chip package units 100.

Therefore, referring to FIG. 3B, the present invention provides a method for calculating out an optimum arrangement pitch between each two LED chip package units, including: firstly, providing a backlight module with a predetermined brightness value (3600 nits) and a predetermined material information such as the backlight module B of FIG. 2 that a customer needs; determining to use 18 LED chip package units 100 with 1200 mcd by a designer according to the brightness value and the material information of the backlight module B; and dividedly arranging the 18 LED chip package units 100 with 1200 mcd determined by the designer on a light-entering area of the backlight module B in order to define the optimum arrangement pitch (8.5 mm) between each two LED chip package units 100.

In conclusion, the present invention can determine what brightness level and amount of LED chip package units need to be used by a designer according to the brightness value and the material information of the backlight module in order to define the optimum arrangement pitch between each two LED chip package units. Hence, the present invention can accurately calculate out the optimum arrangement pitch between each two LED chip package units.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for calculating an optimum pitch between neighboring LED chip package units in a backlight module, comprising:
   providing a backlight module containing a predetermined material and generating light of a desired predetermined brightness value;
   determining a brightness level and a number of LED chip package units for installation at a light-emitting unit of said backlight module depending on said brightness value and the material of the backlight module; and
   arranging said number of the LED chip package units generating light of said brightness level at said light-emitting unit of said backlight module spaced apart at substantially equal pitch between neighboring LED chip package units is in said number thereof.

2. The method as claimed in claim 1, wherein the backlight module is composed of a light-emitting unit, a light guiding board, a reflective board, a diffusing board, a prism board, and an LED light polarizing board.

3. The method as claimed in claim 2, wherein and light beams generated from the light emitting unit are directly projected onto the light guiding board or are indirectly projected onto the light guiding board via the reflective board.

4. The method as claimed in claim 2, wherein the reflective board has a first reflective board portion and a second reflective board portion, wherein light beams generated from the light emitting unit are reflected by the first reflective board portion, and wherein the light beams passing through the light guiding board are reflected by the second reflective board portion.

5. The method as claimed in claim 2, wherein the light guiding board is disposed beside one side of the light emitting unit for receiving light beams generated from the light emitting unit the diffusing board is disposed over the light guiding board, the prism board is disposed over the diffusing board, and the LED light polarizing board is disposed over the prism board.

6. The method as claimed in claim 1, wherein for said predetermined brightness value of approximately 5500 nits, said number of the LED chip package units is 27, said brightness level is 1200 mcd, and said pitch between said neighboring LED chip package units is approximately 5.5 mm.

7. The method as claimed in claim 1, wherein for said predetermined brightness value of approximately 3600 nits, said number of the LED chip package units is 18, said brightness value is 1200 mcd, and said pitch between said neighboring LED chip package units is approximately 8.5 mm.

* * * * *